United States Patent Office 3,380,158
Patented Apr. 30, 1968

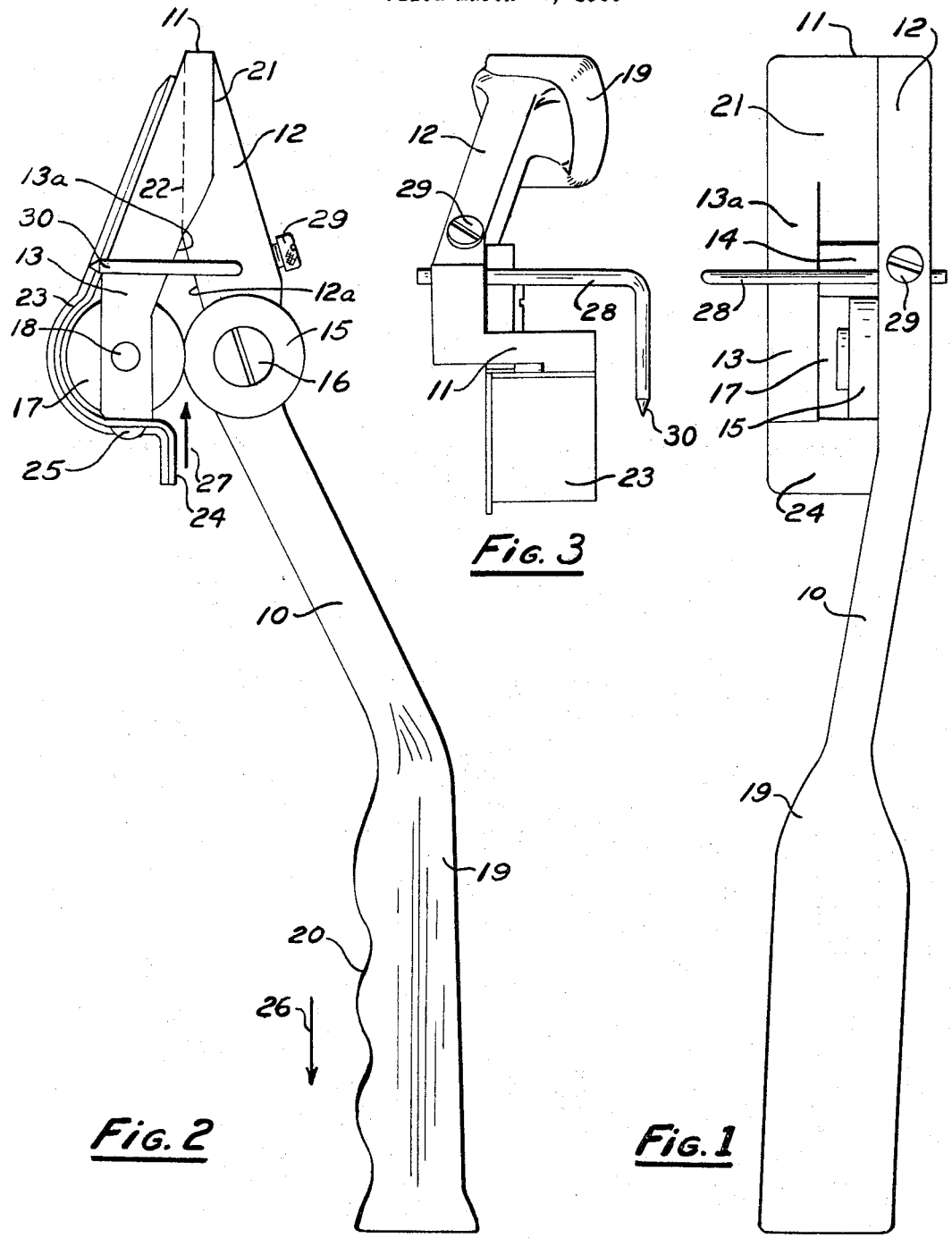

3,380,158
CUTTING TOOL
Edward M. Du Bois, 5054 Pensacola,
Dayton, Ohio 45439
Filed Mar. 23, 1966, Ser. No. 536,811
2 Claims. (Cl. 30—233)

ABSTRACT OF THE DISCLOSURE

A cutting tool having a pair of offset cutter rolls each rotatably mounted on one of a pair of spaced apart legs diverging angularly from an interconnecting bar. At least one of the legs serves to deflect sheet material away from the cutting plane after the material has been cut by the rolls.

This invention relates to cutting tools and, more particularly, to a tool for cutting sheet materials such as paper, cardboard, linoleum, sheet plastic, sheet metal and the like by a continuous shearing action.

While cutting tools of this general type have been known heretofore and, in general, are operable to perform their intended function, such previously known tools are subject to certain disadvantages and/or operating difficulties. For example, such difficulties have included difficulty in providing guidance for severed and unsevered material during and prior to the cutting operation; the necessity in many cases for manual guidance of material to the cutting element prior to a cutting operation; physical interference of the severed and unsevered material with the means employed to move the cutting tool, etc. Accordingly, an object of the present invention is to obviate such difficulties.

Another object is to provide an improved cutting means that is mechanically simple, is relatively inexpensive to manufacture, and is simple and easy to operate.

A further object is to provide an improved cutting means wherein material to be cut is automatically guided into correct position relative to the cutting elements.

Still another object is to provide an improved cutting tool in which the proper positional relationship between elements of the tool and severed and unsevered material being cut is automatically maintained during the cutting process.

Another object is to provide an improved cutting tool that is of rugged construction and is capable of withstanding rough handling, requires a minimum amount of either skilled or unskilled labor to manufacture, which will produce smooth continuous cuts, and can easily be operated by unskilled personnel.

These and other objects will become apparent from the following description taken in conjunction with the accompanying drawings in which:

FIGURE 1 is a plan view of a cutting tool embodying the present invention;

FIGURE 2 is a side elevation of the tool of FIGURE 1; and

FIGURE 3 is an end view of the tool of FIGURES 1 and 2 looking toward the handle end of the tool.

In general, there is provided a bifurcated body upon which various elements of the cutting tool are mounted and wherein the various elements are mounted and disposed in a manner that results in an extremely simplified structure wherein various elements thereof cooperate to provide proper guidance for materials to be cut prior to and during a cutting operation.

Present methods of cutting sheet material such as sheet plastic or sheet metal involve the use of either hand shears or press shears of limited fixed length such as are embodied in a fixed machine. With the cutting tool of the present invention, a cut can be made throughout the entire length of any length of sheet material. Either straight or curved cuts can be made in various kinds of sheet material such as paper, paperboard, linoleum, sheet plastic and/or sheet metal or the like. The cutter rolls or discs roll along the material, one above and below it, shearing the material as they roll thus producing a single continuous smooth cut as contrasted to a succession of separate cuts as are produced with scissors. The tool in which the present invention is embodied is easily drawn and guided by an operator without necessarily requiring specialized training or special skills.

In the drawing, the main body 10 of the tool has at one end thereof a bifurcated portion 11 with upper and lower roll-supporting legs 12 and 13, respectively. The legs 12 and 13 are offset to extend from the bifurcated portion 11 in spaced apart relation with an opening 14 therebetween. Within such spacing or opening 14, a cutter roll 15 is rotatably mounted on a bearing bolt 16 threadedly or otherwise connected to leg 12. Similarly, within such spacing or opening 14, another cutter roll 17 is rotatably mounted on another bearing bolt 18 threadedly or otherwise connected to leg 13.

Rolls 15 and 17 are offset, rather than aligned, and their adjacent side faces are straight and in contacting relationship with arcuate portions of their outer peripheral surfaces in overlapping relationship as is best illustrated in FIGURE 2.

Also, as shown in FIGURE 2, leg 12 is an extension of the main body 10. At the opposite end of body 10 is a handle 19 having a grip portion 20. At the other end of the main body 10, bifurcation 11 has upper and lower surfaces 21 and 22, respectively, extending perpendicular to and connecting legs 12 and 13 at their extremities. A guard 23 encloses the lower portion of cutter roll 17 and terminates in a relatively flat surface 24 extending upwardly beyond the extremity of leg 13 to which guard 23 is secured by any convenient means as, for example, by threaded fasteners 25. Alternatively, if desired, surface 24 may be a unitary extension of leg 13. As is best shown in FIGURE 3, guard 23 preferably is of sufficient extent to extend at least across the lower portions of roll cutters 15 and 17.

During a cutting operation, the tool is drawn, relative to material to be cut, in a direction indicated by arrow 26. Thus, the material to be cut moves, relative to the tool, in the direction of arrow 27. As the material thus moves relative to the tool, it remains uncut until it is engaged by roller cutters 15 and 17. As such relative movement of the material continues, that portion of the material that is beneath roller cutter 15 engages surface 12a of leg 12 which then urges such portion of the material downward from cutter 15 and below leg 12. Similarly, as the material moves relative to the tool, that portion thereof that is above roller cutter 17 is engaged by surface 13a of leg 13 and is thereby urged upward from cutter 17.

To minimize the possibility of waste material and to provide maximum utility in connection with cutting strips of differing widths of material, means are provided for quickly and easily locating the roll cutters 15 and 17 relative to an edge of material to be cut so as to provide a cut strip of desired width. This is accomplished by the provision of an adjustable member 28 adjustably mounted on leg 12 adjacent cutter roll 15. Member 28 is slidably movable relative to leg 12 from left to right as shown either in FIGURE 1 or 3 hereof. Additionally, means are provided for readily detachably securing member 28 to leg 12 in desired relationship thereto and may include a set screw 29. Depending from member 28 is a pointer or indicator portion 30 to provide a reference point against which the edge of material to be cut may be aligned in order to produce a cut strip of a desired width.

As noted above, operation of the tool is extremely simple. In general, such operation merely involves producing relative movement between the cutting tool and a piece of material to be cut. This may be accomplished by an operator first adjusting member 28 to provide a spacing between the overlapping faces of cutter wheels 15 and 17 and the indicator portion 30 corresponding to the desired width of a strip of material to be cut and thereafter securing member 28 in such desired position by means of set screw 29. A sheet of material to be cut is either fed into the cutter rolls 15 and 17, or the tool is moved relative to such fixed material to bring an edge thereof adjacent said cutter rolls and ready for entry therebetween. In either event, the relatively flat surface 24 provides guidance so that the material to be cut and the various components of the cutting tool are brought into proper relation. As the operator produces such relative movement, for example by drawing the cutting tool relative to the material to be cut, the cutter rolls or discs 15 and 17 roll along the material, one above and one below it, thereby shearing the material as they roll thus producing a single continuous smooth cut. Referring particularly to FIGURE 2, after the material has been fed in the direction of arrow 27 so that the above described cutting action takes place, such continued relative movement results in material lying between cutter rolls 15 and 17 and the bifurcated portion 11 engaging walls 12a or 13a, as the case may be. That portion of the material which lays beneath cutter roll 15 during the cutting operation engages surface 12a and is thus guided thereby in the general direction of such surface. Likewise, that portion of the material that lays above cutter roll 17 during the cutting operation engages surface 13a and is guided thereby in a direction generally defined by said surface 13a. Since the relative direction of movement of the cutter tool and the material to be cut is indicated by arrows 26 and 27 respectively it will be seen that the material, prior to cutting lies beneath handle 19 and grip portion 20 and, after completion of the cutting operation, the material is guided in generally opposite directions relative to the bifurcated portion and along surfaces 12a and 13a, respectively, thus providing safety for the hand of the operator as well as avoiding interference between cut or uncut material and hand movement of the operator.

While a particular embodiment of the invention has been illustrated and described, it will be obvious to those skilled in the art that various changes and modifications may be made without departing from the invention and it is intended in the appended claims to cover all such changes and modifications that fall within the true spirit and scope of the invention.

What is claimed is:
1. A cutting tool comprising in combination
   a bar-like body member having opposed ends with a handle portion adjacent one of said ends and having a bifurcated portion substantially perpendicular to said member and depending therefrom at the other of said ends,
      said bifurcated portion having opposed substantially plane surfaces, a first leg portion extending from said bifurcated portion generally toward said handle portion and having a first leg surface connecting with one of said opposed surfaces,
      a second leg portion spaced apart from said first leg portion and depending substantially perpendicular to said bifurcated portion and extending generally toward said handle portion and having a second leg surface connecting with the other of said opposed plane surfaces,
   a pair of cutting rolls carried by said body member in offset relation and with peripheral portions of adjacent faces of said rolls in overlapping relation, each of said rolls being rotatably mounted on one of said leg portions at a location spaced from said bifurcated portion, and deflecting means for deflecting a portion of material after it passes between said pair of cutting rolls including
      said first and second leg portions being disposed in spaced-apart substantially parallel and skewed relation relative to each other and to said opposed surfaces of said bifurcated portion and with at least one of said leg surface portions intersecting a plane containing the points at which said peripheral portions of said rolls overlap at a location between said pair of rolls and said bifurcated portion.
2. A cutting tool in accordance with claim 1 and additionally comprising means for guiding material to be cut by the tool into engagement with said rolls including a second surface connected to one of said legs and disposed substantially parallel to said plane and with the rolls disposed between said interposed member and said second surface.

References Cited
UNITED STATES PATENTS

| | | | |
|---|---|---|---|
| 769,081 | 8/1904 | Hemington | 30—265 |
| 1,098,671 | 6/1914 | Lundy | 30—265 X |
| 1,720,305 | 7/1929 | Tjernlund | 30—265 |
| 1,884,377 | 10/1932 | Temple | 30—265 |
| 1,952,785 | 3/1934 | Bedell | 30—265 |

OTHELL M. SIMPSON, *Primary Examiner.*

WILLIAM FELDMAN, *Examiner.*

J. C. PETERS, *Assistant Examiner.*